Figure 1:
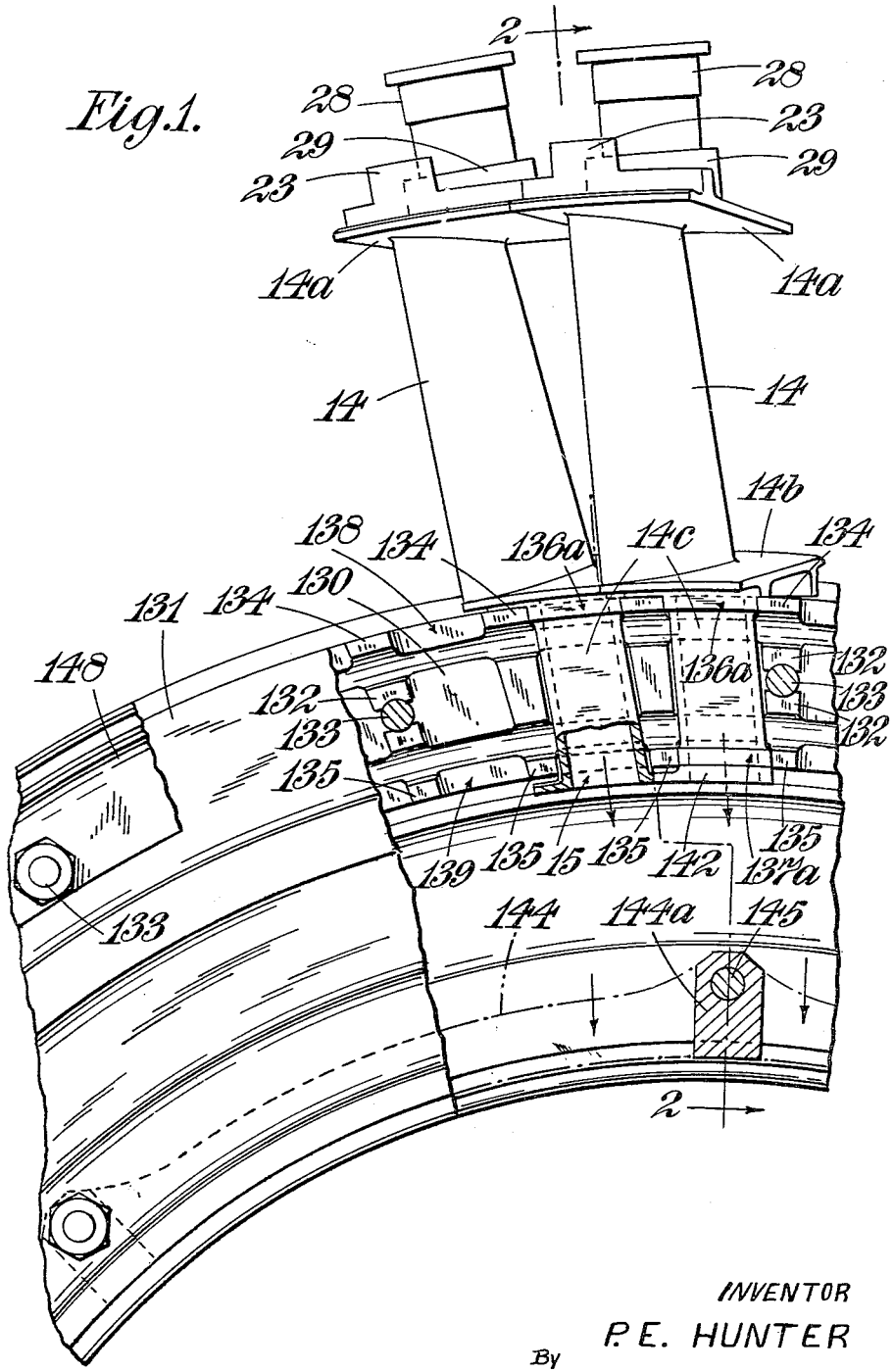

April 10, 1956 P. E. HUNTER 2,741,455
GAS-TURBINE ENGINES AND NOZZLE-GUIDE-VANE
ASSEMBLIES THEREFOR
Filed June 12, 1951 4 Sheets-Sheet 1

INVENTOR
P. E. HUNTER
By Wilkinson + Mawhinney
ATTYS.

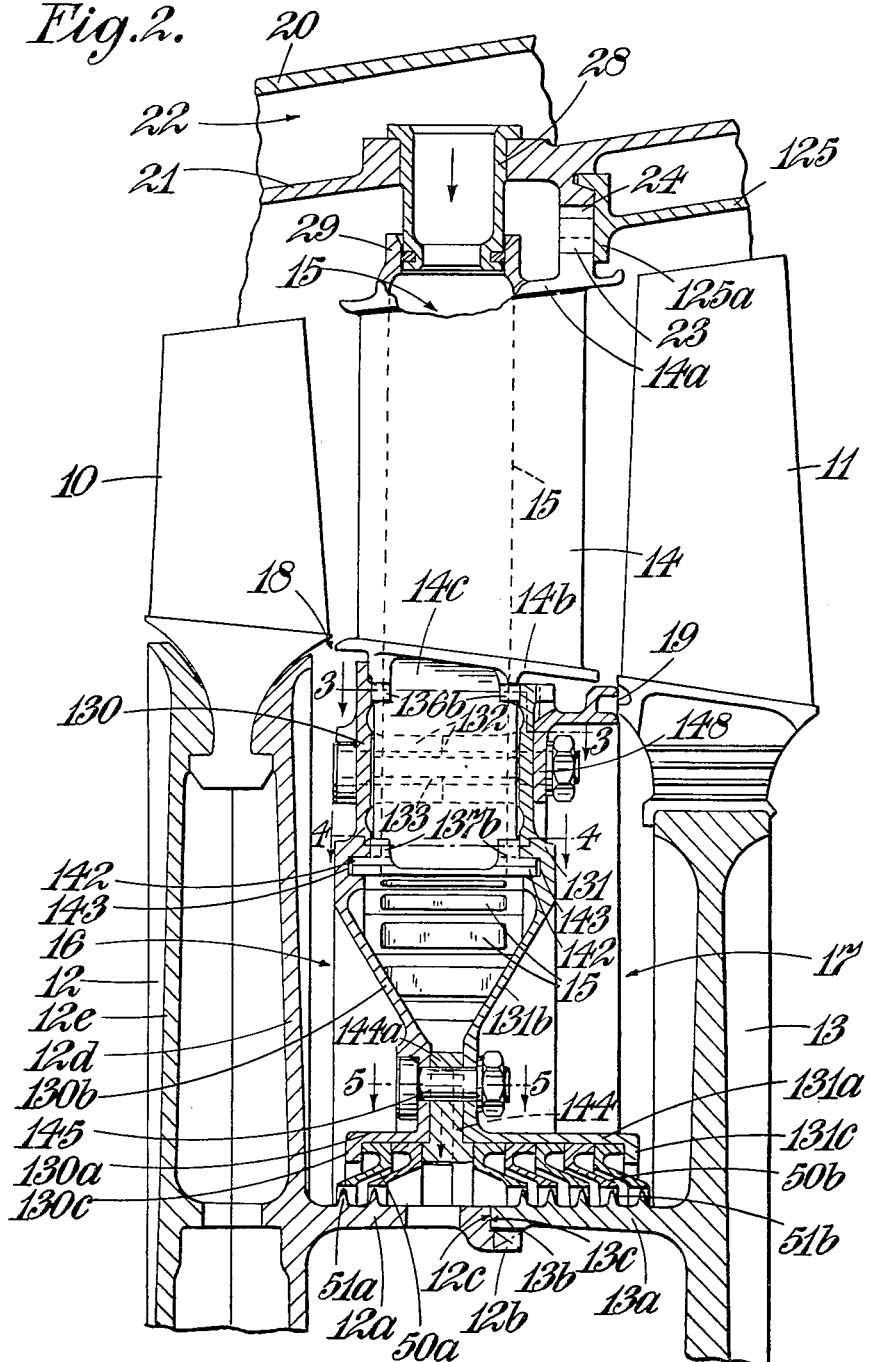

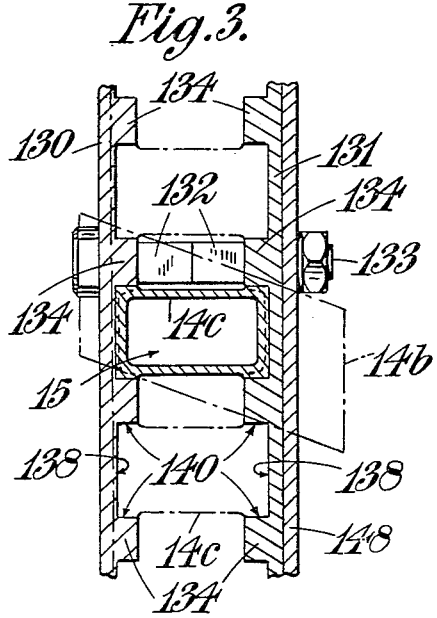
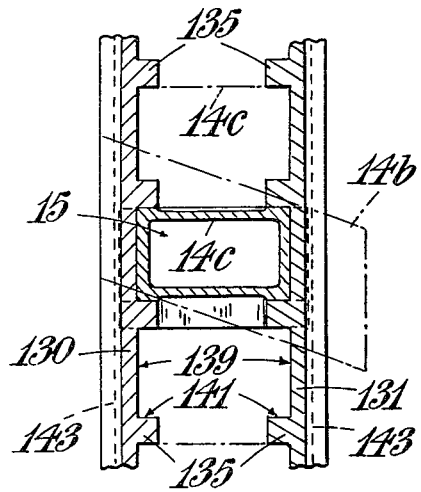
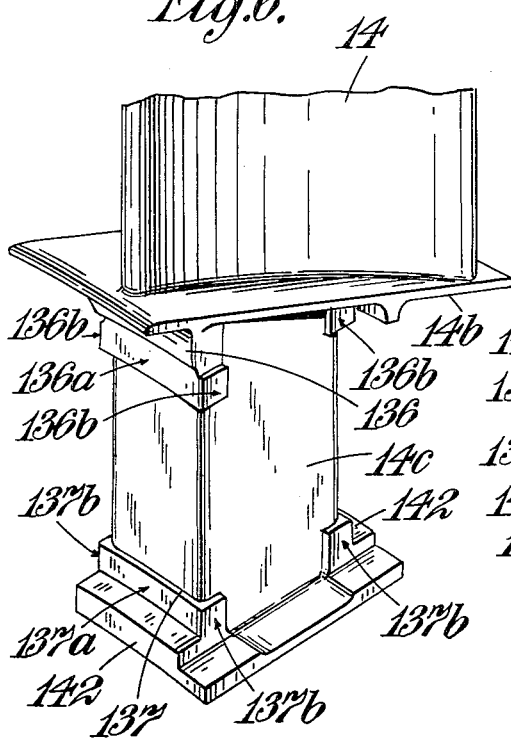
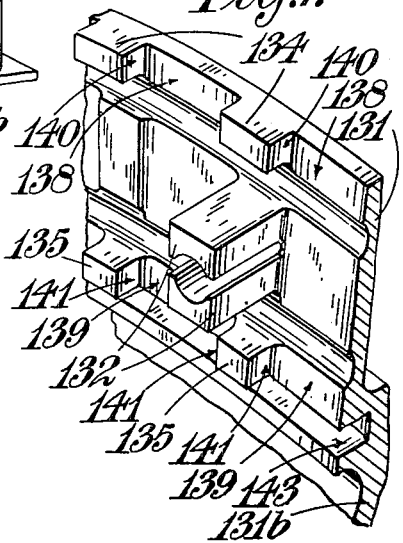
INVENTOR
P. E. HUNTER

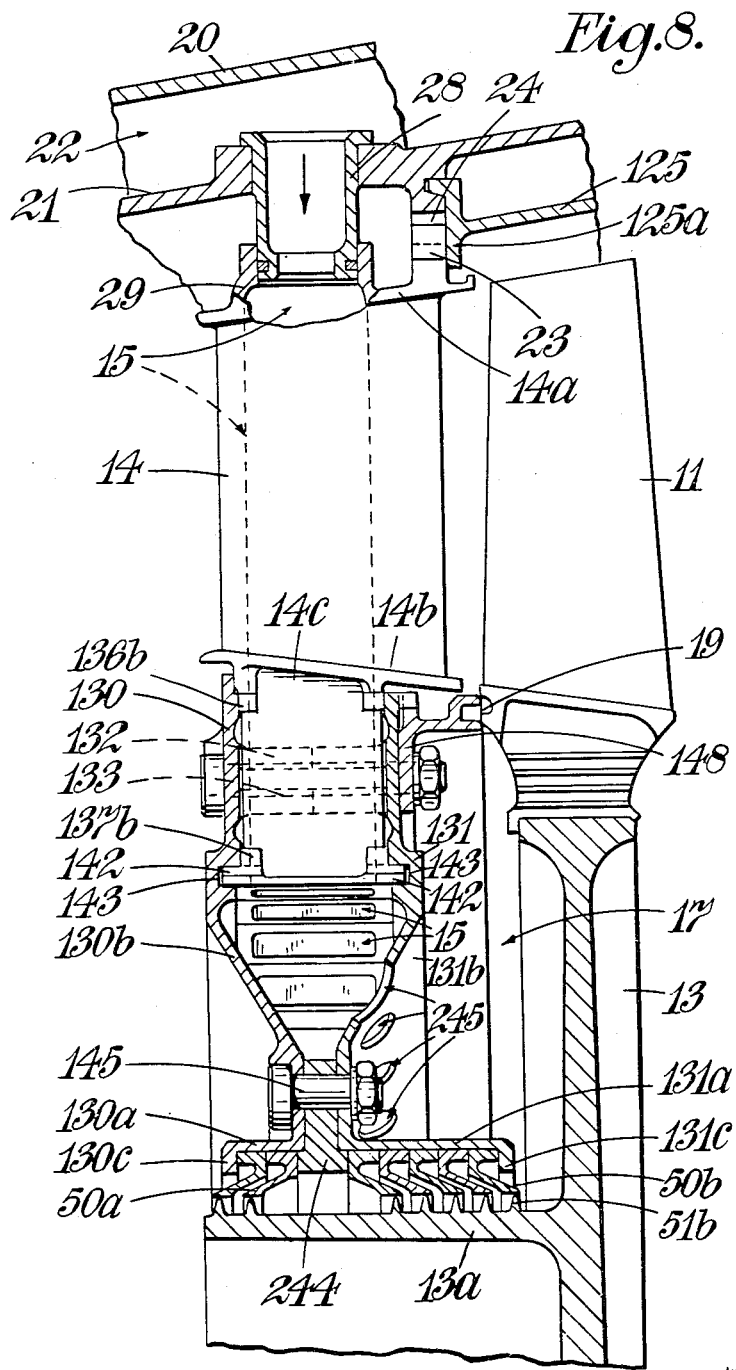

United States Patent Office 2,741,455
Patented Apr. 10, 1956

2,741,455

GAS-TURBINE ENGINES AND NOZZLE-GUIDE-VANE ASSEMBLIES THEREFOR

Philip Edgar Hunter, Chellaston, England, assignor to Rolls-Royce Limited, Derby, England, a British company Application June 12, 1951, Serial No. 231,091

Claims priority, application Great Britain June 29, 1950

5 Claims. (Cl. 253—39.1)

This invention relates to gas-turbine engines and is concerned with gas-turbine engines comprising axial-flow turbines having a nozzle-guide-vane assembly at the entry to a stage of turbine rotor blading.

Since the pressure of the hot gases flowing through the turbine is higher than atmospheric pressure, there is a tendency for the hot gases to flow radially inwardly through the clearance gap between the turbine rotor and the nozzle-guide-vane assembly or associated stationary structure. Such a flow is undesirable since it would result in heating of the surface of the turbine rotor disc.

To avoid this heating, it is common practice to supply to adjacent the surface of the turbine disc relatively cool air which is at a pressure higher than the pressure of the hot gases passing through the turbine system, so that there is a radially outward flow of relatively cool air through each clearance gap, whereby the clearance gaps are "sealed" against the inward flow of hot gas and the turbine rotor disc and rotor blade root fixings are maintained at a relatively low temperature.

Such an air supply has hitherto been derived from an auxiliary fan or from the engine compressor and conveyed by means of air supply pipes or conduits to within the engine casing. This may be undesirable or impracticable, as for example when it is desired to "seal" the clearance gaps between the adjacent faces of two adjacent rotor discs and a nozzle-guide-vane assembly intermediate the two discs, and to cool the said adjacent faces.

According to this invention in one aspect, an axial-flow turbine for a gas-turbine engine comprises a turbine rotor including a rotor disc and rotor blades at the periphery of the disc, and turbine stationary structure including hollow nozzle-guide vanes through the passages in which vanes cooling air is conveyed across the working annulus of the turbine to a clearance space between said turbine disc and said turbine stationary structure to prevent inward flow of hot gas over the surface of the rotor disc. With such an arrangement cooling air supplied to the outer ends of the nozzle-guide vanes can readily be conveyed across the working annulus of the turbine and delivered to between the rotating and stationary structure to flow outwardly and seal the clearance gaps.

According to this invention in another aspect applied in an axial-flow turbine of the multi-stage type, there is provided an axial-flow turbine comprising a pair of axially-spaced rotor discs, a stage of rotor blades carried on each rotor disc, turbine stationary structure in which said rotor discs are rotatively mounted, said turbine stationary structure including a stage of hollow nozzle-guide vanes in flow series between said stages of rotor blades, means to deliver air to the passages in the guide vanes at their outer ends, root portions extending inwardly from said vanes at their inner ends, locating means to locate the root portions of the vanes with respect to one another, there being passages in root portions connected with the passages in the vanes and terminating adjacent their inner ends to deliver air to clearance spaces between said rotor discs and said locating means. With this arrangement cooling air leaving the inner ends of the nozzle-guide vanes passes partly to the upstream end of the nozzle-guide-vanes to seal the upstream clearance gap and partly to downstream of the nozzle-guide-vane assembly to seal the downstream clearance gap.

According to a feature of this invention there is preferably provided inter-turbine sealing means, of which the fixed parts are carried by the locating means and arranged within the ring of guide vanes and co-operate with rotating sealing parts on the rotor discs, and preferably the locating means is arranged to deliver air from the passages in the root portions to between said fixed and rotating sealing parts so that the cooling and sealing air flows from the passages in the root portions through the gaps between the sealing parts to said clearance spaces. Conveniently the sealing parts may afford labyrinth type sealing means and the sealing means may be in the form of a pair of axially-spaced labyrinth-type seals, the cooling air from the root portions being delivered to between the pair of labyrinth-type seals and flowing partly upstream through one labyrinth-type seal to the upstream clearance gap and partly downstream through the other labyrinth-type seal to the downstream clearance gap. In order to accommodate differences in pressure upstream and downstream of the nozzle-guide vanes the labyrinth seal leading to the downstream clearance gap will usually have a greater restriction than that leading to the upstream clearance gap.

According to yet another feature of this invention, the vanes may be provided with radially-elongated root portions each of which root portions has, at each of its axially-spaced ends and adjacent the vane, oppositely and circumferentially-facing outer locating surfaces, and has its parts remote from the vane formed with an axially-extending inner locating surface, and the locating means may afford correspondingly-disposed radially-spaced outer and inner locating surfaces to engage said outer and inner locating surfaces on the root portions respectively and may include clamping means to retain said co-operating locating surfaces in engagement. The formation of the locating means in this manner not only ensures that the root portions are held in their proper relation to one another but also ensures that the cooling air flows without substantial leakage from the root portions through the locating means to the clearance spaces. The inner locating surface on the root portions may be circumferentially facing and may extend part way only across the root portion and the root portion may also have inner and outer axially-facing, circumferentially-extending locating surfaces to co-operate with corresponding surfaces on the locating means. In one preferred arrangement the locating means comprises a pair of axially-spaced annular discs with inner and outer rings of projections to afford circumferentially facing locating surfaces to co-operate with circumferentially-facing locating surfaces on the root portions and with axially-facing locating surfaces between the projections to co-operate with the axially-facing locating surfaces on the root portions. The annular discs in the preferred form also have axial abutment projections to abut the other disc, and preferably to abut the abutment projections of the other disc, to determine the axial spacing of the discs, the discs being held together by clamping bolts extending through the abutment projections.

Where the locating means supports within the ring of guide vanes labyrinth-type sealing means and the locating means comprises a pair of annular discs as above set forth, the discs are conveniently provided at their radially inner peripheries with axially-projecting flanges to afford accommodation for the sealing devices, the flanges being held in axially-spaced relation by spacer means which is adapted to permit the flow of air therethrough from between the annular discs to within the flanges, and the discs being clamped to the spacer means through bolting devices disposed to extend through the discs and said spacer means.

One construction of nozzle-guide-vane assembly in accordance with the invention will now be described by way of example, as applied in a multi-stage turbine of a gas-turbine engine suitable for aircraft propulsion, the description making reference to the accompanying drawings in which:

Figure 1 is an axial view of part of the nozzle-guide-vane assembly with portions broken away to show details of construction, Figure 2 is a section on the line 2—2 of Figure 1 with portions broken away and shows the position of the nozzle-guide-vane assembly in an axial-flow turbine, Figures 3, 4 and 5 are local sections on the lines 3—3, 4—4 and 5—5 respectively of Figure 2, Figure 6 is a perspective view of a part of a vane of the nozzle-guide-vane assembly, Figure 7 is a perspective view of another part of the nozzle-guide-vane assembly which co-operates with the part shown in Figure 6, and Figure 8 is a view corresponding to Figure 2 of a modification.

A gas-turbine engine usually comprises a compressor and a coaxially-arranged turbine and a connecting shaft therebetween, and also combustion equipment wherein air which has been taken in and compressed by the compressor, has fuel burnt with it to heat it, the products of combustion passing to the turbine system. The compressor is thus driven by the turbine and the remaining energy in the exhaust gases may be used in the form of a propulsive jet. Alternatively, the turbine may additionally drive a power output shaft, for example a propeller shaft in an aircraft installation. The construction of the gas-turbine engine as a whole does not form part of the invention and its parts are not illustrated, except as is necessary for an understanding of the invention.

The turbine may comprise one or more stages, and the hot combustion gases enter the first stage from the combustion equipment and the following stages from the preceding stage through respective nozzle-guide-vane assemblies, and the present invention is concerned with such assemblies.

Referring to the drawings, the nozzle-guide-vane assembly embodying the invention is illustrated as the nozzle-guide-vane assembly between two turbines stages. The first stage turbine is shown as comprising a ring of rotor blades 10, carried at the periphery of a hollow disc 12 formed in two parts 12d, 12e, and the second stage turbine comprises a ring of rotor blades 11 carried at the periphery of a solid disc 13. The discs 12, 13 are held in their appropriate spaced relation adjacent their peripheries by cylindrical extensions 12a, 13a having abutment surfaces 12c, 13c and interengaging toothed parts 12b, 13b.

The embodiment illustrated comprises nozzle-guide vanes 14 having outer platforms 14a and inner platforms 14b, which form annular sections of the turbine working fluid channel walls, and elongated root portions 14c extending inwardly from the under sides of the inner platforms 14b, which guide vanes have air passages 15 extending through them from their outer ends to the inner ends of the elongated roots 14c to convey cooling and sealing air across the working fluid channel to the clearance spaces 16, 17 between the inner end of the nozzle-guide-vane assembly and the rotor discs 12, 13 thereby to prevent the inward flow of hot gas from the working fluid annulus through sealing gaps 18, 19 into the clearance spaces 16, 17.

The nozzle guide vanes 14 are engaged with the turbine casing structure in a manner to permit radial freedom of the outer platforms 14a.

The stationary structure comprises an outer wall 20 and an inner wall 21 forming a cooling and sealing air manifold 22 from which the cooling and sealing air is delivered to the guide vanes 14. The cooling air is fed into passages 15 from the manifold 22 by nozzles 28 which slidingly engage holes in the wall 21 and also socket-forming necks 29 on the platforms 14a.

The outer platforms 14a of the guide vanes are provided on their outer surfaces with tooth-like projections 23 which interlock with projections 24 on the inner wall 21 to locate the outer ends of the guide vanes 14 circumferentially with respect to the walls 20, 21. As will be seen the spline or tooth projections 23, 24 permit radial movement between the platforms 14a and the wall 21.

A shroud ring 125 for the second-stage turbine rotor blades 11 is located within the turbine casing structure and is formed at its forward end with a radial flange 125a which abuts axially with the inter-engaging spline formations 23, 24 to locate the nozzle-guide-vane elements 14 against axial movement in a rearward direction, that is towards the second-stage turbine rotor blades 11.

The outer platforms 14a of the nozzle guide vanes 14 may be located axially and circumferentially with respect to the stationary structure in any other convenient manner.

The nozzle guide vanes 14 have their root portions 14c located in all senses with respect to one another and the following structure is employed.

The inner locating structure for the nozzle-guide vanes 14 comprises a pair of annular discs 130, 131, which are formed with axially-extending abutment projections 132 which abut each other whereby the two discs are held in axially spaced relationship. The discs are secured by bolts 133 passing through the abutment projections 132, and it is arranged that the projections lie between the elongated root portions 14c of adjacent nozzle-guide vanes 14. The discs 130, 131 are also formed at an outer radius with axially-directed flanges which are slotted to form axially-extending castellated projections 134. Similar projections 135 are formed at an inner radius. The projections 134, 135 at outer and inner radius are conveniently aligned radially with the abutment projections 132, but are of less axial extent than the abutment projections 132.

The elongated root portions 14c of the vane elements 14 are provided with two radially-spaced sets of abutment pads 136, 137, of which the outer set 136, co-operates with the axially-extending projections 134 of the discs 130, 131 at outer radius and the inner set 137 co-operates with projections 135 at the inner radius of the discs 130, 131. The abutment pads 136, 137 have axially-directed faces 136a, 137a which afford respectively outer and inner axially-facing locating surfaces and which co-operate with corresponding axially-directed outer and inner locating surfaces 138, 139 respectively on each disc, whereby the vane element 14 is located axially with respect to the pair of discs 130, 131, and also have circumferentially-facing outer and inner locating surfaces respectively 136b, 137b which co-operate with the circumferentially-facing locating surfaces 140, 141 on the axially-extending castellated projections 134, 135 respectively of the discs 130, 131 whereby the blades are located circumferentially with respect to the discs 130, 131. The elongated root portion 14c of each vane element 14 is also provided at its end remote from the blade portion with axially-extending circumferentially-directed flanges 142 which engage grooves 143 below the axially-extending projections 135 of the discs 130, 131, whereby the vane elements 14 are located against radial movement with respect to the discs 130, 131.

It will be appreciated that in this manner concentricity of the discs 130, 131 is maintained and thermal expansion of the discs 130, 131 and of the vane elements 14 in a radial direction is allowed for.

The annular discs 130, 131 are formed at their inner peripheries with axially-extending flanges 130a, 131a which are spaced from the portions abutting the elongated root portions 14c of the vanes 14 by converging portions 130b, 131b.

A ring 144 with circumferentially-spaced abutment parts 144a is provided intermediate the two discs 130, 131 adjacent the junction of the parts 130a, 130b and 131a, 131b to space the discs apart, and the discs are additionally secured together by securing bolts 145 which pass through the abutment parts 144a. The discs are arranged to carry at their inner periphery a pair of labyrinth type seals and for this purpose the axially-extending flanges 130a, 131a are formed at their axially-spaced ends with short inwardly-directed radial flanges 130c, 131c. Two sets of frusto-conical sealing members 50a, 50b are assembled in abutting relationship within the axially-extending flanges, and are conveniently retained by being gripped between the inner edge of the spacer member 144 and the short flanges 130c, 131c on the respective discs 130, 131. The frusto-conical sealing members 50a, 50b are arranged to co-operate with corresponding sets of radial fins or ridges 51a, 51b formed on the axially-directed extensions 12a, 13a of the two rotor discs 12, 13.

It will be appreciated that the above described method of locating the elongated blade root portions 14c with respect to the annular discs 130, 131 ensures that the air led radially inwardly through the passages 15 in the vanes 14 passes into the annular space between the converging portions 130b, 131b of the two discs 130, 131 with no substantial leakage. The air flows from between the disc portions 130b, 131b between the abutment parts 144a of the ring 144 to a point intermediate the two labyrinth type seals.

It is arranged that there are a smaller number of frusto-conical seal members 50a and co-operating radial fins 51a on the upstream side of this point than there are frusto-conical seal members 50b and fins 51b on the downstream side, whereby the cooling air emerges from the labyrinth sealing means with a higher pressure on the upstream side than on the downstream side. The cooling air then flows radially outwardly through the spaces 16, 17 between the nozzle-guide-vane assembly and the respective turbine rotor discs 12, 13, thus preventing the flow of hot gases inwardly through the clearance gaps 18, 19.

The gap 19 is formed between a flange seal ring 148 which is secured to the annular disc 131, and the platform parts of the blades 11.

The arrangement whereby the pressure of the cooling air is higher on the upstream side of the nozzle-guide-vane assembly than on the downstream side is desirable, since the pressure of the hot gases will be higher between the first-stage rotor blades 10 and the second-stage nozzle-guide vanes 14 than between the second-stage nozzle-guide vanes 14 and the second-stage rotor blades 11, and will result in an economy of cooling air.

While the construction in accordance with the invention has been described as applied to a two-stage turbine comprising two rotor discs 12, 13 carrying the turbine blades 10, 11 at their peripheries and having between them an intermediate stage of nozzle-guide vanes 14, the two rotor discs being connected to rotate at the same speed, it will be appreciated that the invention is also applicable in the case where the rotor discs 10, 11 are mechanically independent one of the other and rotate at different speeds.

A nozzle-guide-vane assembly in accordance with the invention may also be used in the first stage of the turbine system, that is prior to the first stage of rotor blades. As the temperature of the working gases will generally be high at this point, it is advantageous to employ a nozzle-guide vane which, together with its root fixing, can be cooled.

Such a construction (Figure 8) will be similar to that shown in Figures 1 to 7 except that ring 244 corresponding to the ring 144 will abut the two discs 130, 131 around its whole circumference, and the portion 131b of the disc 131 will be formed with apertures 245 through which the air flows into the space 17 between the nozzle-guide-vane assembly and the adjacent turbine rotor.

I claim:

1. An axial-flow turbine comprising a pair of axially-spaced rotor discs, a set of rotor blades carried on each rotor disc, and turbine stationary structure in which said discs are rotatively mounted, said turbine stationary structure including a row of hollow nozzle-guide-vanes in flow series between said sets of rotor blades, each guide vane having a vane portion and a radially-elongated root portion extending radially inwardly from said vane portion at the inner end of the vane portion and having a passage therethrough from the outer end of its vane portion to its inner end, means connected to the guide vanes at their outer ends to deliver air to the passages in the guide vanes, each of said radially-elongated root portions having adjacent the vane portion oppositely-directed circumferentially-facing plane outer locating surfaces, each of said root portions having an opening at the end of the root portion remote from the vane portion and having a passage extending through the root portion from the passage in the vane portion to said opening in the remote end of the root portion, each of said root portions having said part remote from the vane portion formed with an axially-extending inner locating surface, and locating means having clearance spaces from said rotor discs and locating the root portions of the vanes with respect to one another, said clearance spaces communicating with the openings in said root portions to receive air therefrom, said locating means comprising a pair of axially-spaced annular discs having the root portions between them, at least one of said annular discs having a ring of circumferentially-spaced axial projections each extending between a pair of adjacent root portions and affording circumferentially-facing plane locating surfaces engaging the outer locating surfaces on the root portions, and at least one of said annular discs comprising inner locating surfaces spaced radially inwards from the outer locating surfaces and engaging the inner locating surfaces on the root portions, and clamping means retaining the annular discs with their outer and inner locating surfaces in engagement with the outer and inner locating surfaces respectively of the root portions, said clamping means comprising an axial projection on one of said annular discs and a circumferential flange on each of said root portions engaging under said axial projection.

2. An axial-flow turbine comprising a pair of axially-spaced rotor discs, a set of rotor blades carried on each rotor disc, and turbine stationary structure in which said discs are rotatively mounted, said turbine stationary structure including a row of hollow nozzle-guide-vanes in flow series between said sets of rotor blades, each guide vane having a vane portion and a radially-elongated root portion extending radially inwardly from said vane portion at the inner end of the vane portion and having a passage extending through the vane portion from its outer end to its inner end, means connected to the guide vanes at their outer ends to deliver air to the passages in the guide vanes, each of said radially-elongated root portions having adjacent the vane portion oppositely-directed circumferentially-facing plane outer locating surfaces and having its part remote from the vane portion formed with an axially-extending circumferentially-facing inner locating surface, and locating means having clearance spaces from said rotor discs and locating the root portions of the vanes with respect to one another, said locating means comprising a pair of axially-spaced annular discs having the root portions between them, at least one of the annular discs having a ring of circumferentially-spaced axial projections each extending between a pair of adjacent root portions and affording circumferentially-facing plane locating surfaces engaging the outer locating surfaces on the root portions, and at least one of said annular discs comprising circumferentially-facing inner locating surfaces spaced radially from the outer locating surfaces and engaging the inner locating surfaces on the root portions, said annular discs extending radially inwards beyond said root portions and defining with said root portions a substantially closed annular space radially inwards of the root portions, clamping means retaining the annular discs with their inner and outer locating surfaces in engagement with the inner and outer locating surfaces on the root portions, said clamping means comprising a groove and axial projections on one of said annular discs and an axially-extending circumferential flange on each said root portion engaging in the groove and under one of said axial projections, passages in the root portions interconnecting the inner ends of the passages in the vane portions and said annular space, and outlet means placing said substantially closed annular space in communication with said clearance spaces between said rotor disc and said locating means.

3. An axial-flow turbine comprising a pair of axially-spaced rotor discs, a set of rotor blades carried on each rotor disc, and turbine stationary structure in which said rotor discs are rotatively mounted, said turbine stationary structure including a row of hollow nozzle-guide-vanes in flow series between said sets of rotor blades, each guide vane having a vane portion and a radially-elongated root portion extending radially inwardly from the vane portion at its inner end and a passage through the vane portion from its outer end to its inner end, means connected to the guide vanes at their outer ends to deliver air to the passages in the guide vanes, each root portion having adjacent the vane portion oppositely and circumferentially-facing outer locating surfaces and having its part remote from the vane portion formed with a circumferentially-facing inner locating surface, and also having inner and outer axially-facing circumferentially-extending locating surfaces, locating means having clearance spaces from said rotor discs and locating the root portions of the vanes with respect to one another, said locating means comprising a pair of axially-spaced annular discs having radially-spaced inner and outer rings of circumferentially-spaced axial projections affording radially-spaced inner and outer locating surfaces engaging respectively said inner and outer circumferentially-facing locating surfaces on the root portions, and said annular discs also having axially-facing surfaces between the projections co-operating with said inner and outer circumferentially-extending locating surfaces on the root portions, each said annular disc having axial abutment projections abutting those on the other annular disc to determine the axial spacing of said annular discs, and clamping means comprising bolts extending through said abutment projections and retaining the abutment projections in abutment and also retaining the locating surfaces on the annular discs in engagement with those on the root portions, and passages in the root portions connected with the passages in the vane portions and communicating adjacent the inner ends of the root portions with said clearance spaces to deliver air to said clearance spaces between said rotor discs and said locating means.

4. An axial-flow turbine comprising a pair of axially-spaced rotor discs, a set of rotor blades carried on each rotor disc, and turbine stationary structure in which said rotor discs are rotatively mounted, said turbine stationary structure including a row of hollow nozzle-guide-vanes in flow series between said sets of rotor blades, each guide vane having a vane portion and a radially-elongated root portion extending radially inwardly from said vane portion at its inner end, and having a passage through the vane portion from its outer end to its inner end, means connected to the guide vanes at their outer ends to deliver air to the passages in the guide vanes, each root portion having adjacent the vane portion oppositely and circumferentially-facing outer locating surfaces, and having its part remote from the vane portion formed with a circumferentially-facing inner locating surface and also having inner and outer axially-facing circumferentially-extending locating surfaces, locating means having clearance spaces from said rotor discs and locating the root portions of the vanes with respect to one another, said locating means comprising a pair of axially-spaced annular discs having radially-spaced inner and outer rings of circumferentially-spaced axial projections affording radially-spaced inner and outer locating surfaces engaging respectively said inner and outer circumferentially-facing locating surfaces on the root portions, and also having axially-facing surfaces between the projections engaging with said inner and outer axially-facing circumferentially-extending locating surfaces on the root portions, said annular discs having their inner peripheries at a smaller radius than the inner ends of the root portions, axially-projecting flanges at the inner peripheries of said annular discs affording accommodation for inter-turbine sealing means, spacer means maintaining said discs axially spaced apart adjacent the flanges and permitting the flow of air from between said annular discs to radially within said flanges, and clamping means comprising bolting devices extending through said discs and said spacer means and clamping the discs to the spacer means and retaining the corresponding locating surfaces in engagement, and passages in said root portions connected with the passages in the vane portions and terminating adjacent the inner ends of the root portions to deliver air to between said annular discs adjacent the flanges.

5. An axial-flow turbine comprising a rotor disc, a set of rotor blades carried on said rotor disc, and turbine stationary structure in which said disc is rotatively mounted, said turbine stationary structure including a row of hollow nozzle-guide-vanes in flow series with said set of rotor blades, each guide vane having a vane portion and a radially-elongated root portion extending radially inwardly from said vane portion at the inner end of the vane portion and having a passage therethrough from the outer end of its vane portion to its inner end, means connected to the guide vanes at their outer ends to deliver air to the passages in the guide vanes, each of said radially-elongated root portions having adjacent the vane portion oppositely-directed circumferentially-facing plane outer locating surfaces and having its part remote from the vane portion formed with an axially-extending circumferentially-facing inner locating surface, and locating means having a clearance space from said rotor disc and locating the root portions of the vanes with respect to one another, said locating means comprising a pair of axially-spaced annular discs having the root portions between them, at least one of said annular discs having a ring of circumferentially- spaced axial projections each extending between a pair of adjacent root portions and affording circumferentially-facing plane locating surfaces engaging the outer locating surfaces on the root portions, and at least one of said annular discs comprising circumferentially-facing inner locating surfaces spaced radially inwards from the outer locating surfaces and engaging the inner locating surfaces on the root portions, and clamping means retaining the annular discs with their outer and inner locating surfaces in engagement with the outer and inner locating surfaces respectively of the root portions, said clamping means comprising an axial projection on one of said annular discs and a circumferential flange on each of said root portions engaging under said axial projection, and passages in said root portions connected with the passages in the vane portions and communicating adjacent the inner ends of the root portions with said clearance space to deliver air to said clearance space between said rotor disc and said locating means.

References Cited in the file of this patent

UNITED STATES PATENTS

| | | |
|---|---|---|
| 2,436,087 | Benson | Feb. 17, 1948 |
| 2,488,867 | Judson | Nov. 22, 1949 |
| 2,488,875 | Morley | Nov. 22, 1949 |
| 2,606,741 | Howard | Aug. 12, 1952 |

FOREIGN PATENTS

| | | |
|---|---|---|
| 14,746 | Great Britain | of 1908 |
| 359,350 | Great Britain | Oct. 22, 1931 |
| 383,506 | Germany | Oct. 13, 1923 |
| 617,472 | Great Britain | Feb. 7, 1949 |